(12) United States Patent
Burg et al.

(10) Patent No.: US 6,782,238 B2
(45) Date of Patent: Aug. 24, 2004

(54) METHOD FOR PRESENTING MEDIA ON AN ELECTRONIC DEVICE

(75) Inventors: Bernard Burg, Menlo Park, CA (US); Craig Sayers, Menlo Park, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 123 days.

(21) Appl. No.: 10/214,027

(22) Filed: Aug. 6, 2002

(65) Prior Publication Data

US 2004/0029086 A1 Feb. 12, 2004

(51) Int. Cl.[7] .............................. G09B 9/00; G09B 5/00
(52) U.S. Cl. ........................................... 434/1; 434/309
(58) Field of Search ...................... 434/1, 27, 247–255, 434/308, 309

(56) References Cited

U.S. PATENT DOCUMENTS

| 5,742,521 | A | | 4/1998 | Ellenby et al. | 364/550 |
|---|---|---|---|---|---|
| 6,031,545 | A | | 2/2000 | Ellenby et al. | 345/435 |
| 6,100,925 | A | * | 8/2000 | Rosser et al. | 348/169 |
| 6,173,239 | B1 | | 1/2001 | Ellenby | 702/150 |
| 6,522,312 | B2 | * | 2/2003 | Ohshima et al. | 345/8 |
| 6,671,390 | B1 | * | 12/2003 | Barbour et al. | 382/103 |

FOREIGN PATENT DOCUMENTS

WO  WO 98/20795  * 5/1998

* cited by examiner

Primary Examiner—John Edmund Rovnak

(57) ABSTRACT

A method for presenting media on an electronic device. A landmark is identified based on a landmark sensor of the electronic device. Media is selected based on the landmark. The media is presented on the electronic device.

35 Claims, 8 Drawing Sheets

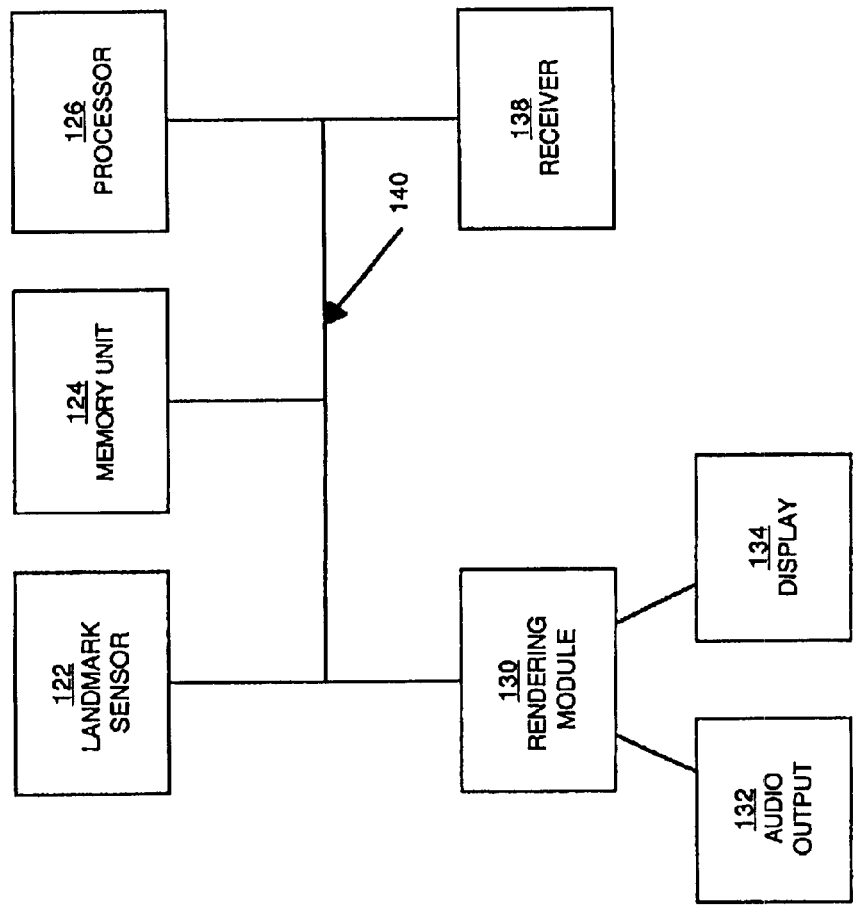

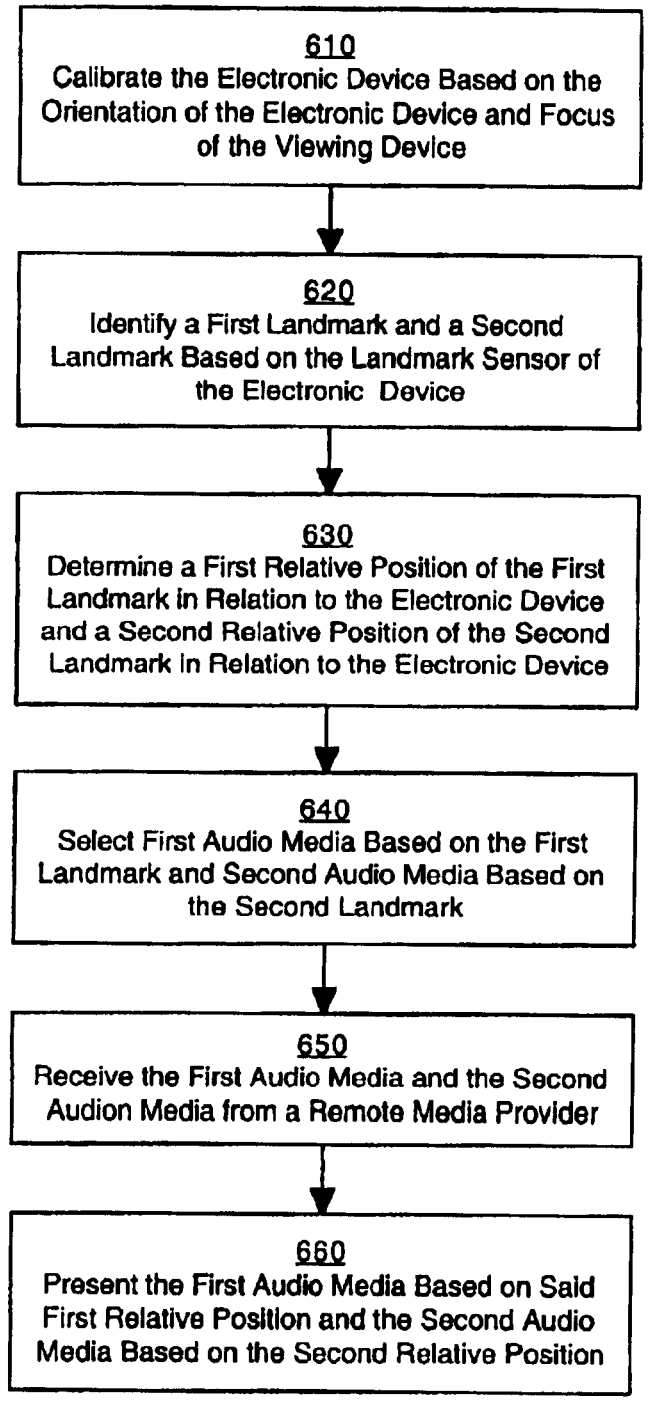

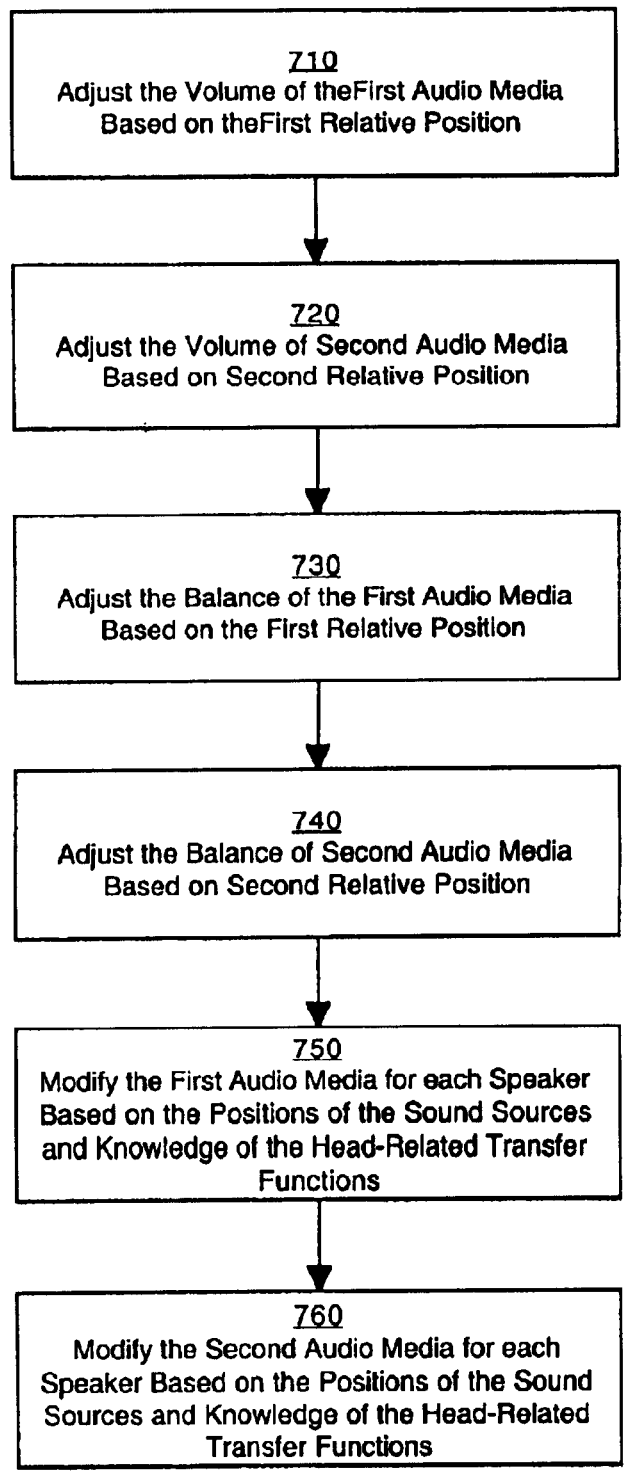

METHOD FOR PRESENTING MEDIA ON AN ELECTRONIC DEVICE

FIELD OF INVENTION

Various embodiments of the present invention relate to the field of media presentation.

BACKGROUND OF THE INVENTION

For thousands of years, people have attended live spectator events, such as sporting or theatrical events. Currently, spectators at these events are limited in their participation. Due to the nature of most live spectator events, direct participation for the spectator is rarely available. While there are ways of providing a spectator with an enhanced viewing experience, these ways typically are limited in content and only provided a limited enhancement.

Often, a spectator may desire to listen to audio content while viewing a sporting event. Currently, a spectator may bring a personal radio, and listen to the event while viewing it live. However, this audio content is provided at the discretion of the audio provider (e.g., radio station), and typically very general in nature. In particular, there is typically only one audio feed for a sporting event, and the spectator has no control over the audio content. Additionally, at a sporting event where more than one event is taking place at the same time (e.g., a track and field event with several events on the same field), there is typically no audio content available for each individual event.

Furthermore, a spectator may bring a portable television to the sporting event to view the action on the field from a different angle. However, as with audio content, video content is provided at the discretion of the video provider (e.g., television station). While there are usually several cameras positioned throughout the field of the event, only one image is shown to the viewing audience. The spectator cannot select which camera to watch, they are simply presented with the camera as selected by the video provider.

As described above, spectators at sporting and theatrical events are often provided with peripheral audio and visual information to enrich the quality of their viewing experience. However, this peripheral information is often at the control of a third party, as in the instance of radio or television programs. Currently, a spectator is provided with limited peripheral content, and that content is provided solely at the discretion of the content provider.

SUMMARY OF THE INVENTION

A method for presenting media on an electronic device. A landmark is identified based on a landmark sensor of the electronic device. Media is selected based on the landmark. The media is presented on the electronic device.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1B is a block diagram of intelligence of an electronic device for presenting media in accordance with one embodiment of the present invention.

FIG. 6 is a flowchart of a process for presenting audio media in accordance with one embodiment of the present invention.

FIG. 7 is a flowchart of a process for presenting a plurality of audio media based on relative position of a corresponding landmark in accordance with one embodiment of the present invention.

BEST MODE(S) FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Embodiments of the present invention provide an electronic device for presenting media to a spectator at a live event, for example a sporting event. The present invention creates a new experience for a spectator, enhancing their perception while at a live event. In one embodiment, the spectator observes the event through an electronic device (e.g., electronic device 100 of FIG. 1A), which enhances not only the visual effects, but provides access to audio and/or video media content. It should be appreciated the embodiments of the present invention are not limited to live events, and may be directed at recorded events, such as a television program.

Figure 1A:
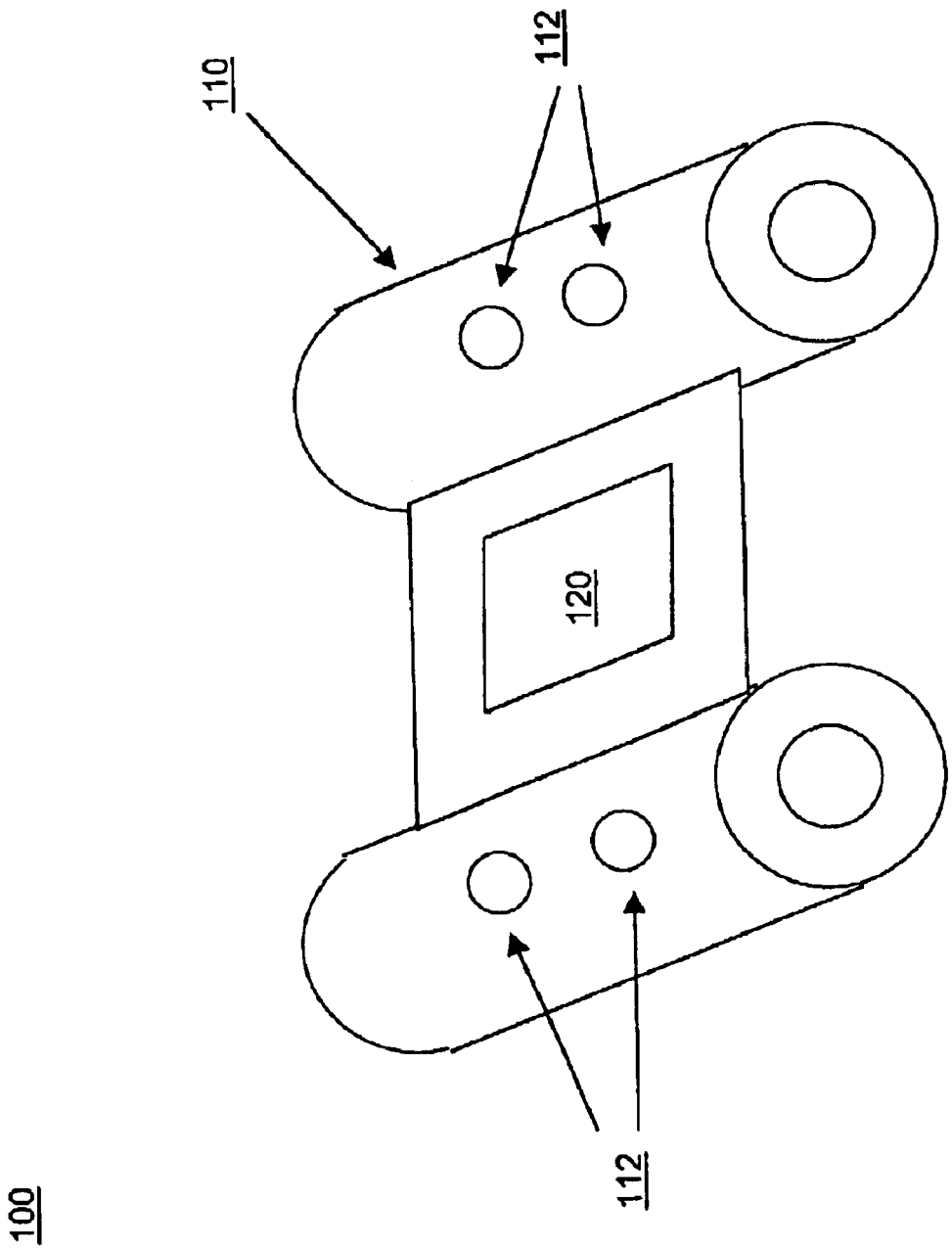
FIG. 1A is a schematic diagram of an exemplary electronic device for presenting media in accordance with one embodiment of the present invention.

FIG. 1A is a schematic diagram of an exemplary electronic device 100 for presenting media in accordance with one embodiment of the present invention. In one embodiment, electronic device 100 comprises a viewing device 110, at least one selector 112, and intelligence 120. In one embodiment, viewing device 110 is a pair of binoculars. It should be appreciated that viewing device 110 may be any device for use in viewing, and is not intended to be limited to the present embodiment. Viewing device 110 may be, but is not limited to a camera, a video camera and a telescope. In one embodiment, viewing device 110 can be focused. By providing a focus for viewing device 110, it is possible for a viewer to converge on a desired landmark or marker. The focal length provides a distance at which a landmark or marker is being viewed.

In one embodiment, selectors 112 comprise buttons. In another embodiment, selectors 112 comprise toggle switches. In another embodiment, selectors 112 comprise a roller wheel. In one embodiment, selectors 112 are operable to allow a user to select desirable media. In another embodiment, selectors 112 are operable to allow a user to control characteristics of a rendering module (e.g., rendering module 130 of FIG. 1B). For example, selectors 112 may be used to adjust the volume for audio output and contrast and/or brightness for visual output.

FIG. 1B is a block diagram of intelligence 120 of electronic device 100 of FIG. 1A in accordance with one embodiment of the present invention. In one embodiment, intelligence 120 comprises bus 140, landmark sensor 122, memory unit 124, processor 126 and rendering module 130. It should be appreciated that memory unit 124 may comprise computer readable volatile memory (e.g., random access memory, static RAM, dynamic, RAM, etc.) for storing information and instructions for processor 126 and/or a computer readable non-volatile memory (e.g., read only memory, programmable ROM, flash memory, EPROM, EEPROM, etc.) for storing static information and instructions for processor 126. In one embodiment, processor 126 is operable to perform a process for presenting media (e.g., process 400 of FIG. 4).

In one embodiment, landmark sensor 122 is an image sensor. In the present embodiment, landmark sensor 122 is operable to identify a landmark by comparing the image to a stored landmark (e.g., marker) image. Landmark sensor 122 may be an internal camera for recognizing images. In one embodiment, the appearance and placement of a visual marker is stored in memory unit 124. It should be appreciated that a plurality of images may be stored for identifying a plurality of distinct visual markers.

In another embodiment, landmark sensor 122 identifies a landmark based on a characteristic of the landmark. For example, a landmark can have a flashing light wherein the landmark is identified by the pattern of the flashes of the flashing light. It should be appreciated that a plurality of patterns may be stored for identifying a plurality of visual markers. In another embodiment, a landmark is identified based on its color. It should be appreciated that any identifying characteristic may be used to uniquely identify a landmark or marker.

In one embodiment, landmark sensor 122 is an orientation sensor. In the present embodiment, landmark sensor 122 operates to determine which direction electronic device 100 is oriented in. Where electronic device 100 comprises viewing device 110, landmark sensor 122 operates to determine the direction electronic device 100 is pointed in (e.g., the direction of the landmark being viewed). In another embodiment, landmark sensor 122 operates to determine a landmark being viewed based on the direction electronic device 100 is pointed in and the focus of viewing device 110.

It should be appreciated that landmark sensor 122 operates to determine a location (e.g., a landmark, a marker, a point of interest). In one embodiment, as described above, landmark sensor 122 determines a landmark based on an orientation and/or focus of viewing device 110. In another embodiment, landmark sensor 122 determines a landmark based on image analysis. In general, any landmark sensor 122 can be any sensor or device used in determining and identifying a point in space.

In one embodiment, memory unit 124 comprises landmark information (e.g., the location of the landmark). For example, the landmark information may comprise images of the markers for use in image analysis for identifying a landmark or information about the characteristics of each landmark for use in identification. In one embodiment, memory unit 124 comprises information linking a landmark to specific media. It should be appreciated that a landmark has media associated therewith. Once a landmark is identified, the media associated with that landmark may be presented.

In one embodiment, rendering module 130 is operable to present media. Rendering module 130 comprises an audio output 132 for presenting audio media. Audio output 132 may be a headphone jack for inserting headphones. In another embodiment, audio output 132 is a speaker. In one embodiment, rendering module 130 comprises display 134 for presenting visual media. In one embodiment, display 134 resides within viewing device 110.

In one embodiment, when a visual marker is identified, media associated with the marker is presented. In one embodiment, electronic device 100 comprises receiver 138 for receiving media from a remote media provider (e.g., media provider 200 of FIG. 2). Receiver 138 receives media over a wireless connection. In one embodiment, receiver 138 is a radio receiver for receiving radio broadcast signals. In one embodiment, receiver 138 is a television receiver for receiving television broadcast signals. Providing media over a wireless connection allows for dynamic access to an extensive amount of content. Since media need not be stored in memory unit 124, live media can be provided to a spectator. For example, at a track meet, a spectator can focus on the long jump to hear live commentary concerning the event, focus to the javelin area to hear that commentary, and focus on the track to hear racing commentary. At a football game, a spectator could focus on one part of the field to hear conversations between the players near that point. A spectator could focus on the referee to hear what they were saying.

Furthermore, a video feed may be provided wherein a spectator can access the feed and view the event from cameras located close to the action. By using selectors (e.g., selectors 112 of FIG. 1A), a spectator may toggle through cameras located close to the event. In one embodiment, by using a selector, a spectator may lock in a particular landmark, allowing them to direct electronic device in a different direction and still maintain the audio and/or video feed from the locked in landmark.

Figure 2:
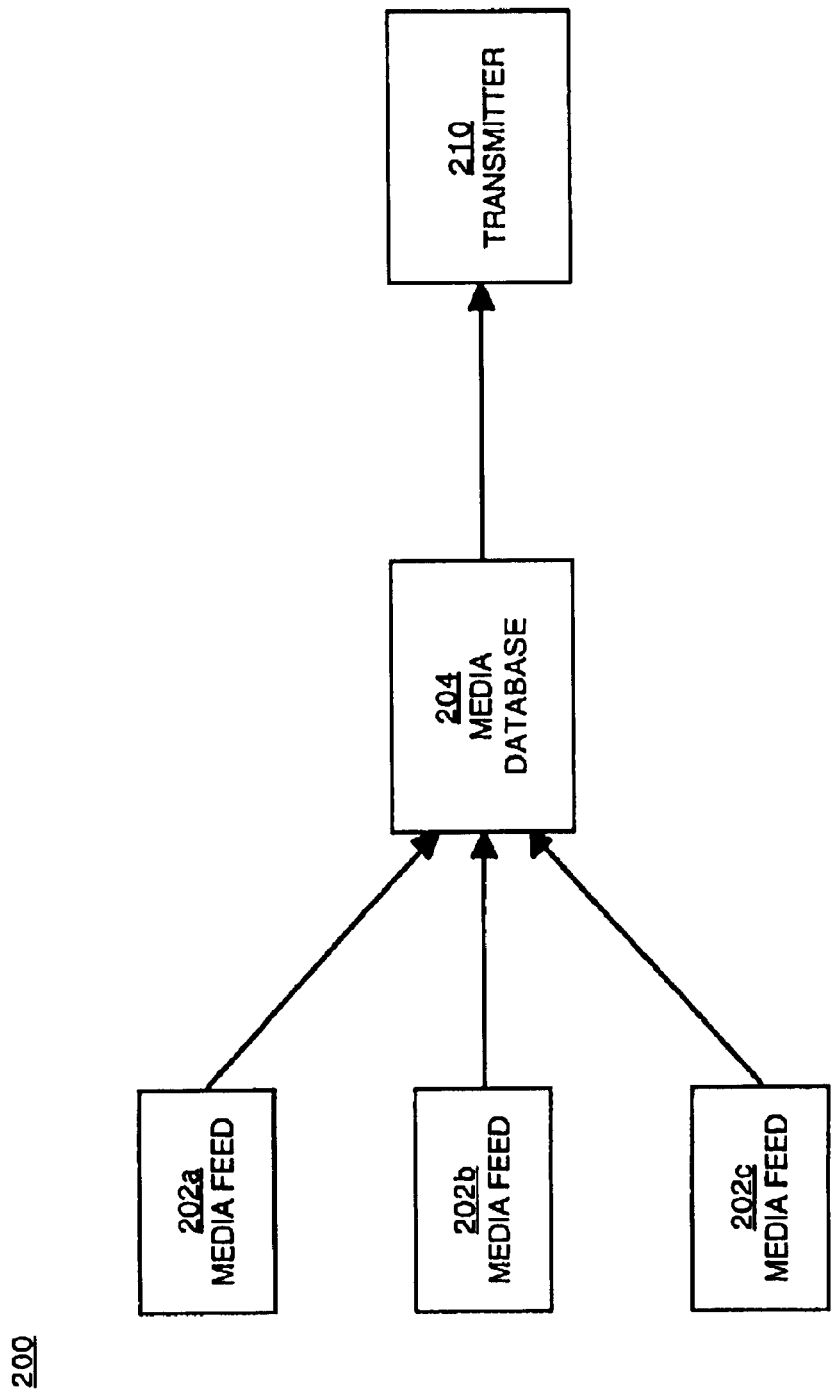
FIG. 2 is a block diagram of a media provider in accordance with one embodiment of the present invention.

FIG. 2 is a block diagram of a media provider 200 in accordance with one embodiment of the present invention. In one embodiment, media provider 200 comprises media database 204 and transmitter 210. In one embodiment, media database 204 receives a plurality of media feeds 202. It should be appreciated that media database 204 can receive any number of media feeds, and is not limited to media feeds 202a–c of the present embodiment. Furthermore, it should be appreciated that media feeds 202 may be audio feeds or video feeds, and may be live feeds or pre-recorded feeds.

In one embodiment, media feeds 202a–c are radio broadcast signals. Media database 204 receives media feeds 202a–c, and transmits media feeds 202a–c to an electronic device (e.g., electronic device 100) through transmitter 210. The radio broadcasts are received at the electronic device. Based on the landmark or landmarks the electronic device is directed towards, a particular radio broadcast or broadcast is presented to the user of the electronic device.

Figure 3:
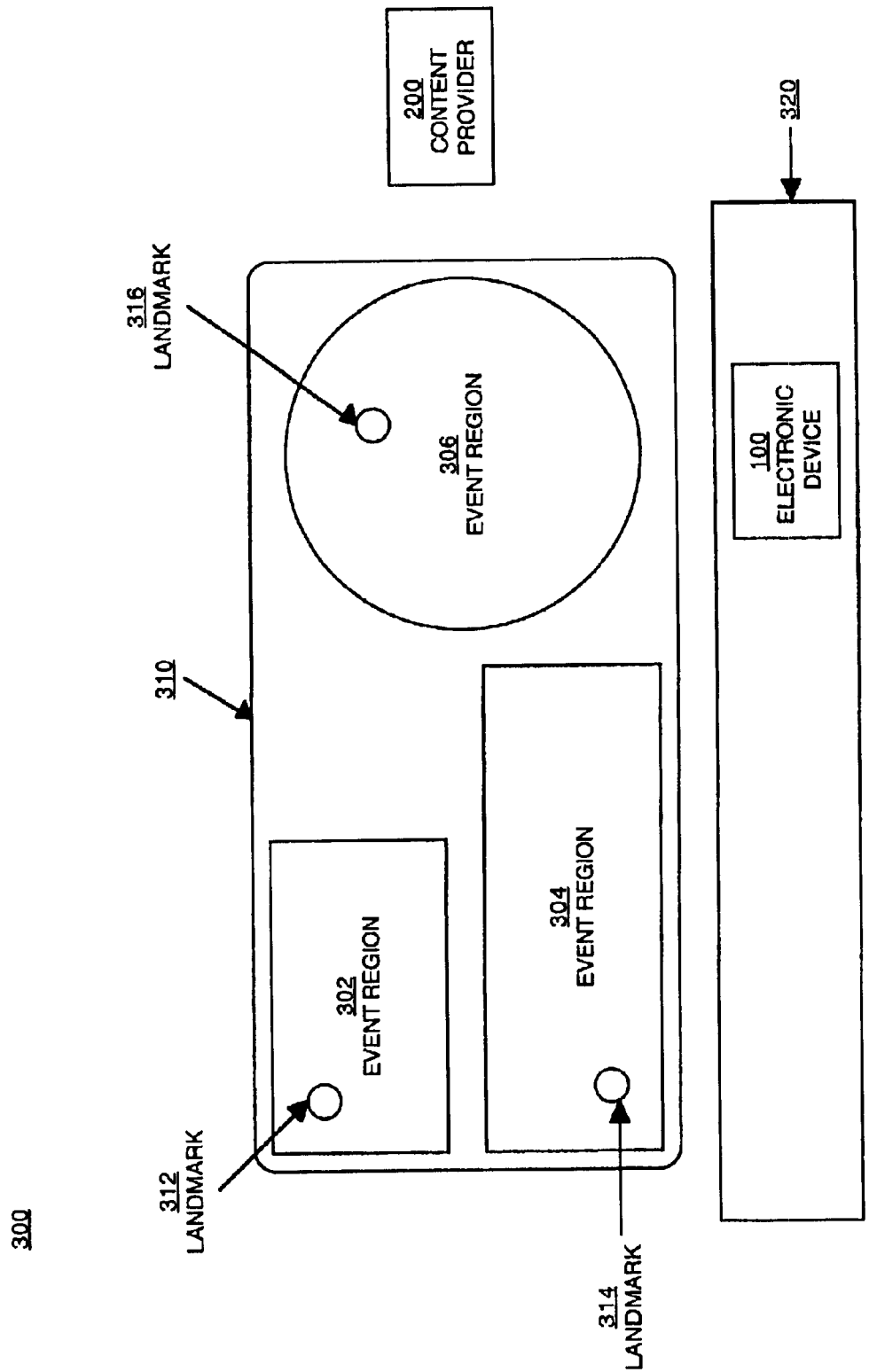
FIG. 3 is an overhead diagram of an exemplary sporting event upon which embodiments of the present invention may be practiced.

For illustrative purposes, FIG. 3 is an overhead diagram of an exemplary sporting event 300 upon which embodiments of the present invention may be practiced. It should be appreciated that embodiments of the present invention are not limited to sporting events, and that the present embodiment is exemplary. In one embodiment, sporting event 300 is occurring on field 310, and spectators are located in stands 320 for viewing the event. In the present embodiment, sporting event 300 is a track and field meet. In one embodiment, field 310 is divided into different regions, wherein each region is dedicated to one event. In the present embodiment, field three is divided into three event regions: event region 302, event region 304, and event region 306.

Located within each region is a landmark (e.g., landmarks 312, 314 and 316). It should be appreciated that there can be more than one landmark per region. In one embodiment, a landmark is a fixed marker. In another embodiment, a landmark is movable (e.g., an athlete or a referee). It should be appreciated that anything located within field 310 can be defined as a landmark.

In one embodiment, a spectator is located within stands 320. The spectator is equipped with electronic device 100 of FIG. 1A. In one instance, the spectator is using electronic device 100 to view the event (e.g., 100 meter dash) occurring in event region 304. In order to activate the media for event region 304, the spectator views landmark 314. Once landmark 314 is identified the spectator is presented with media associated with landmark 314.

In one embodiment, the available media is accessed from remote media provider 200 by a wireless connection. Remote media provider 200 is located in the vicinity of sporting event 300, and is available for wireless access to a vast amount of media. As described above, once landmark 314 is identified, media provider 200 automatically provides an audio soundtrack accompanying the action occurring in event region 304. It should be appreciated that media provider 200 may have access to a multitude of media, such as live audio and video feeds.

Similarly, if a spectator using electronic device 100 desires to view an event, the spectator directs electronic device 100 at a landmark within the new event region of the new event. For example, if the spectator decides to view the event (e.g., discuss toss) occurring within event region 306, the spectator directs electronic device 100 at landmark 316. By directing electronic device 100 at different event regions, the spectator is presented with media for the event which they are watching.

As described above in one embodiment, a spectator may lock in a particular landmark, allowing them to direct electronic device in a different direction and still maintain the audio and/or video feed from the locked in landmark. For example, a spectator is watching the event in region 304 and is listening to audio content associated with event region 304. The spectator may desire to continue listening to the event in event region 304 while watching the event at region 306. In one embodiment, by using a selector (e.g., selector 112 of FIG. 1A) may lock in to landmark 314. The media is still presented for event region 304 while the spectator watches event region 306. If the spectator later decides to receive media associated with event region 306, landmark 314 may be unlocked by using a selector.

In one embodiment, the athletes and referees are provided with a wireless microphone. In one embodiment, the audio channels for every player whose marker (e.g., landmark) is visible in the viewing device of electronic device 100 may be mixed in the audio output. By determining the relative position of the markers in the display, the audio channels can be spatially distributed using 3D spatialized audio. For example, a player to the left would sound as though they were on the left and a player to the right would sound as though they were on the right.

Furthermore, multiple audio feeds associated with multiple landmarks can be merged to provide an enhanced experience. For example, consider a soccer match where all athletes are identified as a landmark and are provided with a wireless microphone. As electronic device 100 scans over the action, the volume for each landmark (e.g., athlete) will increase or decrease based on their relative position. For example, as electronic device 100 scans from left to right, the volumes for each players microphone will increase and decrease.

Figure 4:
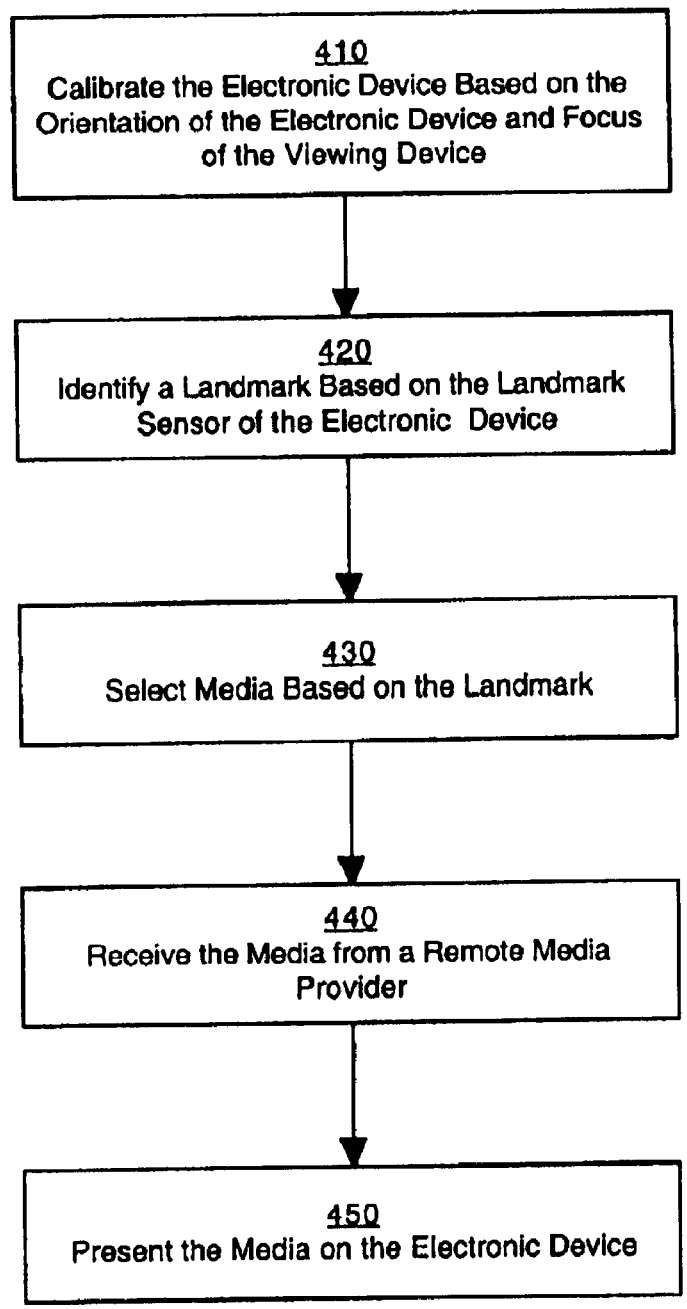
FIG. 4 is a flow chart of a process for presenting media in accordance with one embodiment of the present invention.

FIG. 4 is a flow chart of a process 400 for presenting media in accordance with one embodiment of the present invention. In one embodiment, process 400 is carried out by processors and electrical components under the control of computer readable and computer executable instructions. Although specific steps are disclosed in process 400, such steps are exemplary. That is, the embodiments of the present invention are well suited to performing various other steps or variations of the steps recited in FIG. 4. As depicted in FIG. 4, process 400 diagrams the operating process of presenting media on an electronic device, for example, electronic device 100 of FIG. 1A.

At step 410 of process 400, the electronic device is calibrated based on the orientation of the electronic device (e.g., the direction it is facing) and the focus of the viewing device (e.g., the distance to the focal point). In one embodiment, the electronic device is used to scan around a stadium with the viewing device (e.g., binoculars). The orientation and focus of the binoculars are measured. Using visible fixed markers on the field, the relationship between orientation and viewpoint can be computed, calibrating the electronic device. In one embodiment, the orientation information is used to supplement or replace the sensed fixed marker positions in instances where the markers are not clearly visible in view. It should be appreciated that calibrating the electronic device is optional.

At step 420, a landmark is identified based on a landmark sensor of the electronic device. In one embodiment, a landmark (e.g., a marker or a point of interest) is a predetermined physical location that is associated with an aspect of a live event. In one embodiment, physical markers are placed around a field in an athletic event. In one embodiment, physical markers are placed on an athlete's clothing. It should be appreciated that a can be defined for any aspect of the event for which a spectator would desire peripheral information.

Figure 5A:
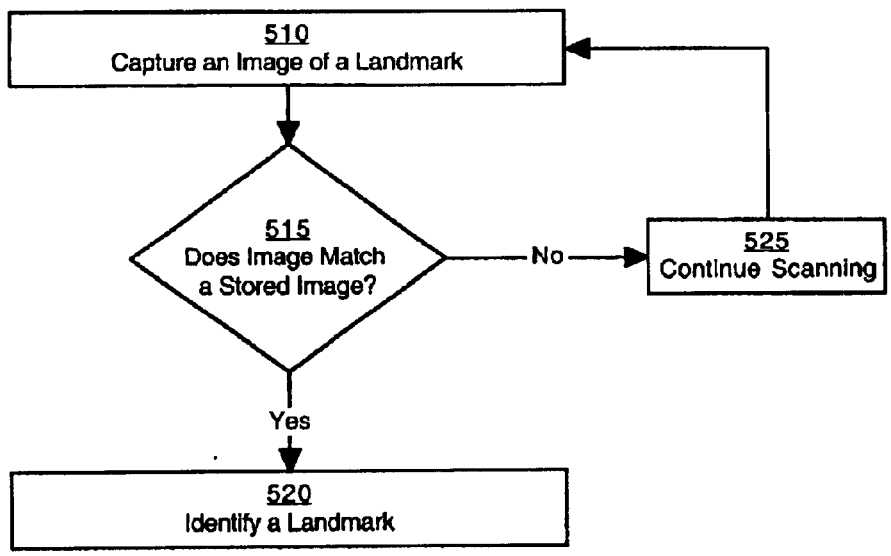
FIG. 5A is a flow chart of a process for identifying a landmark using an image sensor in accordance with one embodiment of the present invention.

In one embodiment, a landmark is identified using an image sensor. FIG. 5A is a flow chart of a process 500 for identifying a landmark using an image sensor in accordance with one embodiment of the present invention. At step 510 of process 500, an image is captured. It should be appreciated that an image may be captured by an image capturing technique known in the art. In one embodiment, an image is captured using a digital camera.

At step 515, it is determined whether the captured image matches a stored image. In one embodiment, images identifying predetermined landmarks (e.g., markers) are stored within the electronic device. In one embodiment, the captured image is compared to a stored image. Provided the captured image does not match a stored image, as shown at step 525, the electronic device continues to scan (e.g., capture more images). Alternatively, provided the captured image does match a stored image, as shown at step 520, a landmark is identified, and process 500 proceeds to step 430 of FIG. 4.

Figure 5B:
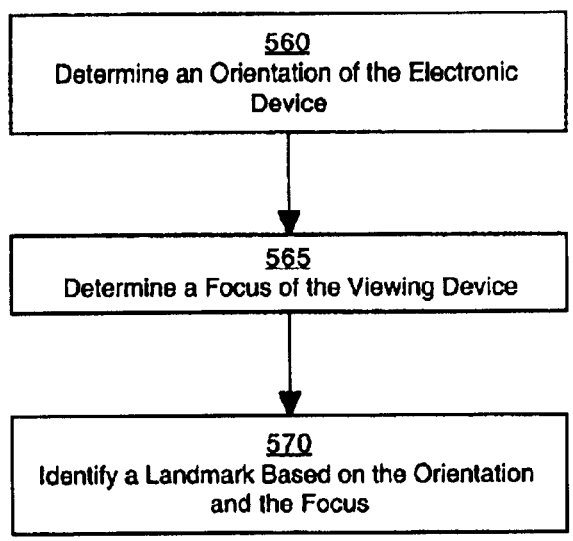
FIG. 5B is a flow chart of a process for identifying a landmark using an orientation sensor in accordance with one embodiment of the present invention.

In another embodiment, a landmark is identified using an orientation sensor. FIG. 5B is a flow chart of a process 550 for identifying a landmark using an orientation sensor in accordance with one embodiment of the present invention. At step 560 of process 550, an orientation of the electronic device is determined. At step 565 of process 550, a focus of the viewing device (e.g., binoculars) of the electronic device is determined. Based on the orientation and focus, as shown at step 570, a landmark is identified. In another embodiment, a landmark is identified using characteristics of the landmark.

With reference to FIG. 4, at step 430, media is selected based on the landmark. In one embodiment, the electronic device has stored therein which media is associated with a particular landmark. Upon identifying the landmark, the media is automatically presented, as shown at step 440. In one embodiment, the selected media is stored on a remote media provider. At step 440, the selected media is received from a remote media provider. In one embodiment, the remote media provider is a media database. It should be appreciated that the remote media provider may have access to a multitude of media, including but not limited to: live audio and video feeds, prerecorded audio and video feeds, statistical information, general event information, and the Internet.

At step 450, the media is presented on the electronic device. In one embodiment, the media is presented on a rendering module (e.g., rendering module 130 of FIG. 1B) of the electronic device. In one embodiment, the media is presented over an audio output for presenting audio media (e.g., a headphone jack or speakers) of the rendering module. In one embodiment, the media is presented on a display for presenting visual media of the rendering module.

FIG. 6 is a flowchart of a process 600 for presenting audio media in accordance with one embodiment of the present invention. In one embodiment, process 600 is carried out by processors and electrical components under the control of computer readable and computer executable instructions. Although specific steps are disclosed in process 600, such steps are exemplary. That is, the embodiments of the present invention are well suited to performing various other steps or variations of the steps recited in FIG. 6. As depicted in FIG. 6, process 600 diagrams the operating process of presenting audio media on an electronic device, for example, electronic device 100 of FIG. 1A.

At step 610 of process 600, the electronic device is calibrated, as descried at step 410 of FIG. 4. It should be appreciated that step 610 is optional. At step 620, a first landmark and a second landmark are identified based on a landmark sensor of the electronic device. In one embodiment, the first landmark and the second landmark are identified using an image sensor, as shown at process 500 of FIG. 5A. In another embodiment, the first landmark and the second landmark are identified using an orientation sensor, as shown at process 550 of FIG. 5B. In another embodiment, the first landmark and the second landmark are identified using characteristics of the first landmark and the second landmark respectively.

With reference to FIG. 6, at step 630, a first relative position of the first landmark and a second relative position of said second landmark are determined. The first relative position is determined based on the relation of the first landmark to the electronic device. Similarly, the second relative position is determined based on the relation of the second landmark to the electronic device.

At step 640, first audio media is selected based on the first landmark and second audio media is selected based on the second landmark. At step 650, the selected media is received from a remote media provider. In one embodiment, the remote media provider is a media database (e.g., media database 204 of FIG. 2) for providing multiple audio feeds.

At step 660, the first audio media is presented based on the first relative position and the second audio media is presented based on the second relative position. FIG. 7 is a flowchart of a process 660 for presenting a plurality of audio media based on relative position of a corresponding landmark in accordance with one embodiment of the present invention.

At step 710 of process 660, a volume of the first audio media is adjusted based on the first relative position. Similarly, at step 720, a volume of the second audio media is adjusted based on the second relative position. By using the relative positions of the first and second landmarks, the volume can be adjusted so that the closer the landmark is to the center of the display, the higher the volume is. Steps 710 and 720 represent presenting media in monaural sound (e.g., adjusting the volume based on the relative positions of the sound sources). It should be appreciated that for embodiments where monaural sound is presented, process 660 stops at step 720.

At step 730, a balance of the first audio media is adjusted based on the first relative position. Similarly, at step 740, a balance of the second audio media is adjusted based on the second relative position. By using the relative positions of the first and second landmarks, the balance can be adjusted so that the first audio media and second audio media can be mixed to present a more realistic audio experience. For example, a landmark (e.g., a player with a microphone attached) to the left of the image would sound as though they were on the left. As a spectator scans around using the viewing device of the electronic device, the volume and balance of the audio media is adjusted to create an interactive experience. Steps 710 to 740 represent presenting media in stereo sound (e.g., adjusting the volume and balance based on the relative positions of the sound sources). It should be appreciated that for embodiments where stereo sound is presented, process 660 stops at step 740.

At step 750, the first audio media is modified for to account for the way a listener's head and ears influence the sounds received. Similarly, at step 760, the second audio media is modified to account for the way a listener's head and ears influence the sounds received. By modifying the first and second audio media to account for the way a listener's head and ears influence the sounds received, referred to as the head-related transfer function (HRTF), the first audio media and second audio media can be spatially distributed using 3D spatialized audio. 3D spatialized audio can present an audio signal in a manner that appears to a listener using headphones that the sound is originating from some distance away and from a particular direction. Steps 710 to 760 represent presenting media in spatialized sound (e.g., adjusting the volume and balance based on the relative positions of the sound sources and on knowledge of the HRTF).

Embodiments of the present invention provide an interactive experience for spectator at live event. Furthermore, embodiments of the present invention provide an electronic device for presenting media that is intuitive and easy to use, requiring no learning time or manual reading. The present invention is particularly useful in following multiple simultaneous events occurring at one location (e.g., the Olympic games or a track meet).

Embodiments of the present invention provide a sensory amplifier to a spectator, as it enhances the vision by the sound of the action and the corresponding comments. This gives an interactive experience of a live event, as the spectator has access to the additional visual and audio media, including comments from athletes, sounds of the event, and replays of the event. The present invention provides a new sense of freedom and interactivity to the spectator, as the spectator has the opportunity to observe many things in the stadium, at any moment by directing the electronic device at a desired location.

The preferred embodiment of the present invention, a method and device for presenting media, is thus described. While the present invention has been described in particular embodiments, it should be appreciated that the present invention should not be construed as limited by such embodiments, but rather construed according to the below claims.

What is claimed is:

1. A method for presenting media on an electronic device, said method comprising:
    identifying a landmark based on a landmark sensor of said electronic device;
    locking into the landmark to receive said media based on said landmark;
    presenting said media on said electronic device; and
    maintaining said locking into the landmark to present said media on said electronic device while said electronic device is directed away from the landmark to other landmarks.

2. The method as recited in claim 1 wherein said electronic device comprises a viewing device for guiding said landmark sensor of said electronic device.

3. The method as recited in claim 2 further comprising calibrating said electronic device based on an orientation of said electronic device and a focus of said viewing device.

4. The method as recited in claim 1 wherein said landmark sensor is an image sensor.

5. The method as recited in claim 4 wherein said identifying comprises:
    capturing an image of said landmark; and
    provided said image matches a stored image, identifying said landmark.

6. The method as recited in claim 2 wherein said landmark sensor is an orientation sensor.

7. The method as recited in claim 6 wherein said identifying comprises:
    determining an orientation of said electronic device;
    determining a focus of said viewing device;
    identifying said landmark based on said orientation and said focus.

8. The method as recited in claim 2 wherein said identifying said landmark is based on a characteristic of said landmark.

9. The method as recited in claim 1 further comprising receiving said media from a remote media provider.

10. The method as recited in claim 1 wherein said media is audio media.

11. The method as recited in claim 1 wherein said media is visual media.

12. The method as recited in claim 1 wherein said landmark is a physical marker.

13. An electronic device for presenting media comprising:
    a bus;
    a memory unit coupled to said bus;
    a processor coupled to said bus, said processor for performing a method of presenting media;
    a landmark detector coupled to said bus, said landmark detector for identifying a moveable landmark adapted to transmit said media to a remote media transmitter;
    a receiver coupled to said bus, said receiver for receiving media from the remote media transmitter; and
    a rendering module coupled to said bus, said rendering module for presenting said media based on said landmark.

14. The electronic device as recited in claim 13 wherein said landmark detector is an image detector for identifying said landmark based on an image.

15. The electronic device as recited in claim 13 further comprising a viewing module for directing an orientation of said electronic device and determining a focus of said viewing module.

16. The electronic device as recited in claim 15 wherein said landmark detector is an orientation sensor for identifying said landmark based on said orientation and said focus.

17. The electronic device as recited in claim 13 wherein said rendering module comprises an audio output for presenting audio media.

18. The electronic device as recited in claim 13 wherein said rendering module comprises a display for presenting visual media.

19. The electronic device as recited in claim 13 further comprising a receiver coupled to said bus for receiving said media from a remote media transmitter.

20. The electronic device as recited in claim 13 wherein said moveable landmark is a participant of a sporting event.

21. A method for presenting audio media on an electronic device, said method comprising:
    identifying a first landmark and a second landmark based on a landmark sensor of said electronic device;
    determining a first relative position of said first landmark in relation to said electronic device and a second relative position of said second landmark in relation to said electronic device;
    selecting first audio media based on said first landmark and second audio media based on said second landmark; and
    presenting said first audio media and said second audio media based on said first relative position and said second relative position.

22. The method as recited in claim 21 further comprising receiving said first audio media and said second audio media from a remote media provider.

23. The method as recited in claim 21 wherein said first landmark and said second landmarks are physical markers.

24. The method as recited in claim 21 wherein said presenting said first audio media and said second audio media comprises:
    adjusting a volume of said first audio media based on said first relative position; and
    adjusting a volume of said second audio media based on said second relative position.

25. The method as recited in claim 21 wherein said presenting said first audio media and said second audio media comprises:
    adjusting a balance of said first audio media based on said first relative position; and adjusting a balance of said second audio media based on said second relative position.

26. The method as recited in claim 21 wherein said presenting said first audio media and said second audio media comprises:
   modifying the first audio media based on said first relative position and on a head-related transfer function; and
   modifying the second audio media based on said second relative position and on said head-related transfer function.

27. An electronic device for presenting media comprising:
   a bus;
   a memory unit coupled to said bus;
   a processor coupled to said bus for executing instructions for presenting media;
   a landmark detector coupled to said bus, said landmark detector for identifying at least one of a plurality of moveable landmarks that transmits media;
   a receiver coupled to said bus for receiving media transmitted from the at least one of the moveable landmarks; and
   a rendering module coupled to said bus for presenting said media of said at least one moveable landmark.

28. The electronic device of claim 27 wherein the moveable landmarks include wireless microphones for transmitting audio media.

29. The electronic device of claim 27 further comprising an audio output, wherein media from different moveable landmarks are mixed and provided to the audio output of the electronic device.

30. The electronic device of claim 29 wherein the media from different moveable landmarks are mixed based on a relative position of the landmarks to each other.

31. The electronic device of claim 27 further comprising a media output, wherein media from multiple landmarks are merged and provided to the media output of the electronic device.

32. The electronic device of claim 31 wherein the multiple landmarks are participants in a sporting event.

33. The electronic device of claim 27 further comprising an audio output, wherein a volume of multiple landmarks increases or decreases as the electronic device scans over the multiple landmarks.

34. An electronic device, comprising:
   a bus;
   memory coupled to said bus;
   a landmark sensor coupled to said bus; and
   a processor coupled to said bus for executing instructions to perform:
      identifying, with the landmark sensor, a first landmark and a second landmark;
      determining a first relative position of said first landmark in relation to said electronic device and a second relative position of said second landmark in relation to said electronic device;
      selecting first audio media based on said first landmark and second audio media based on said second landmark; and
      presenting said first audio media and said second audio media based on said first relative position and said second relative position.

35. The electronic device of claim 34 wherein said presenting said first audio media and said second audio media further comprises:
   adjusting a volume of said first audio media based on said first relative position; and
   adjusting a volume of said second audio media based on said second relative position.

* * * * *